United States Patent Office 3,435,422
Patented Mar. 25, 1969

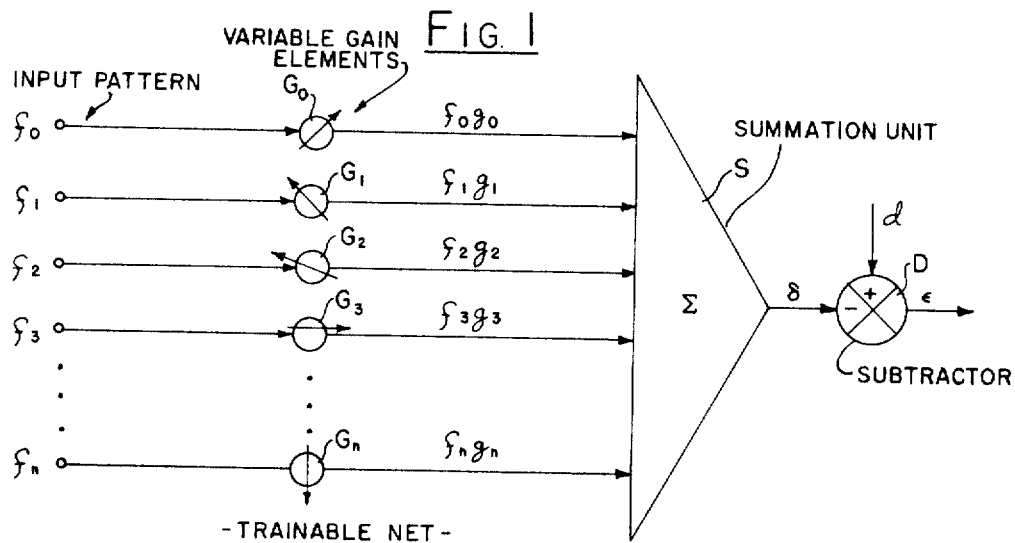
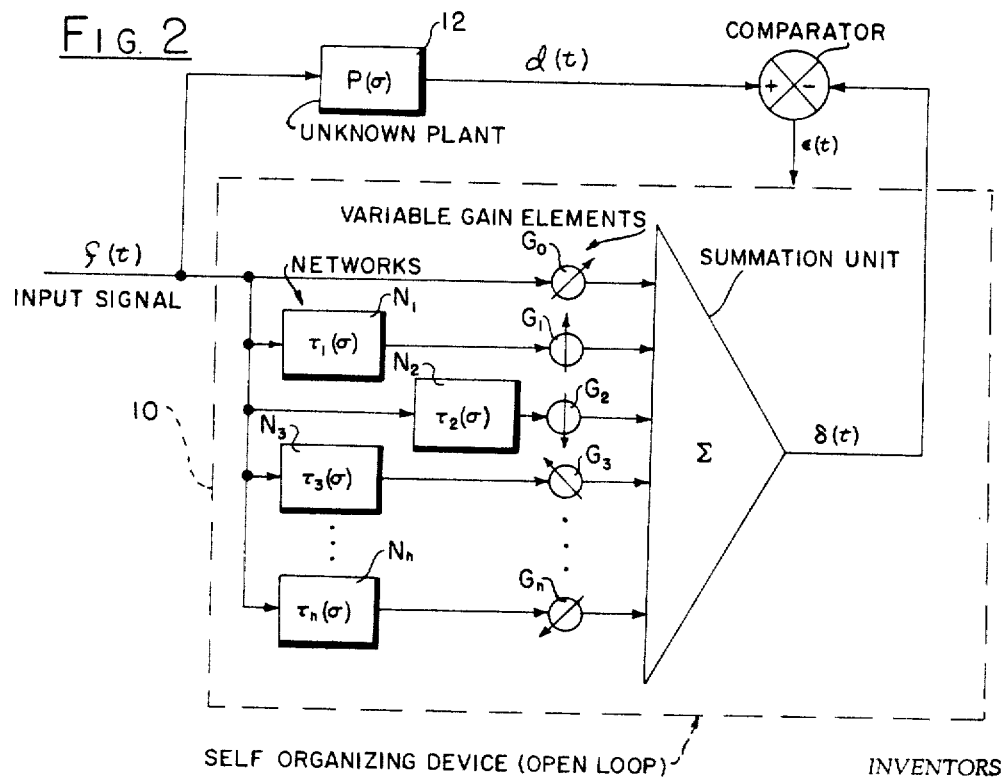

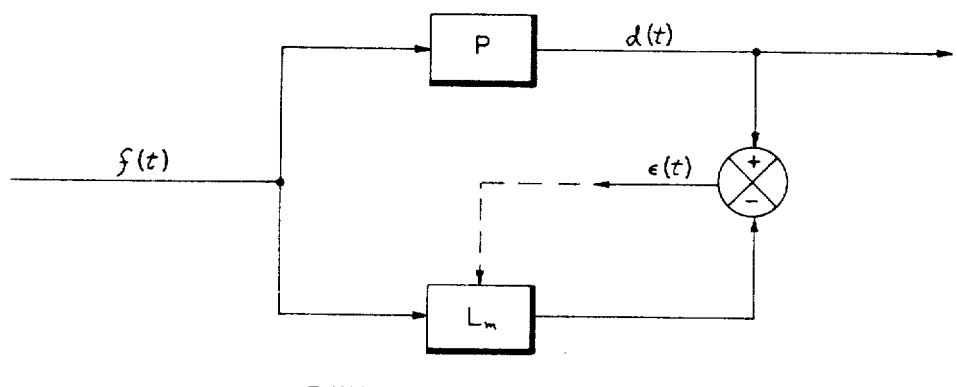
– FUNCTION MODELLING MODE –
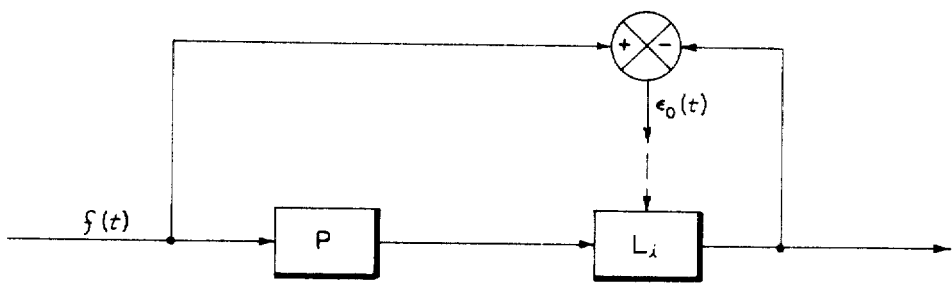
– FUNCTION INVERTING MODE –

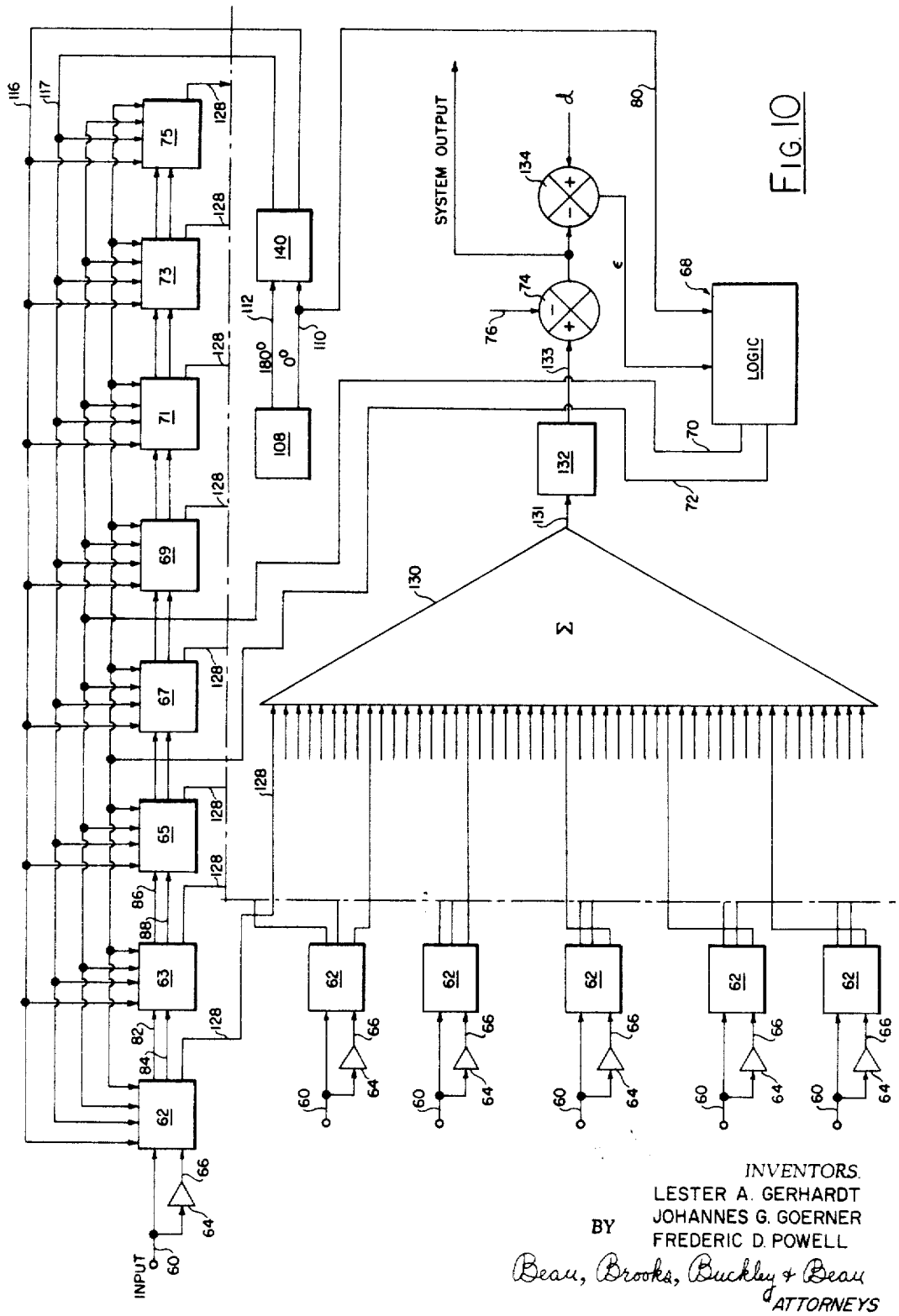

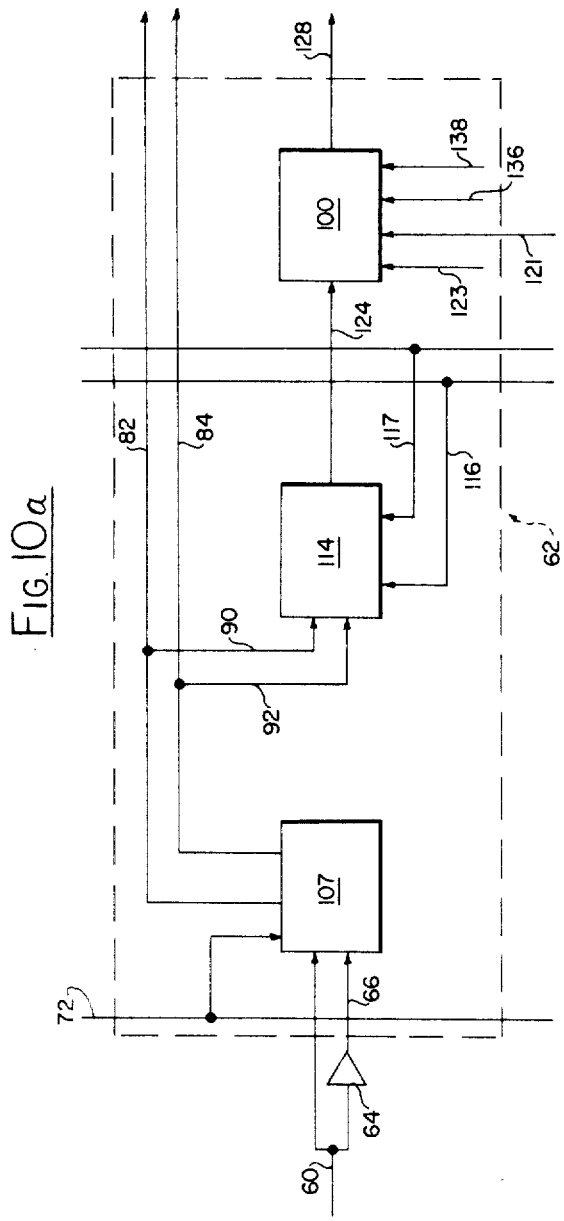

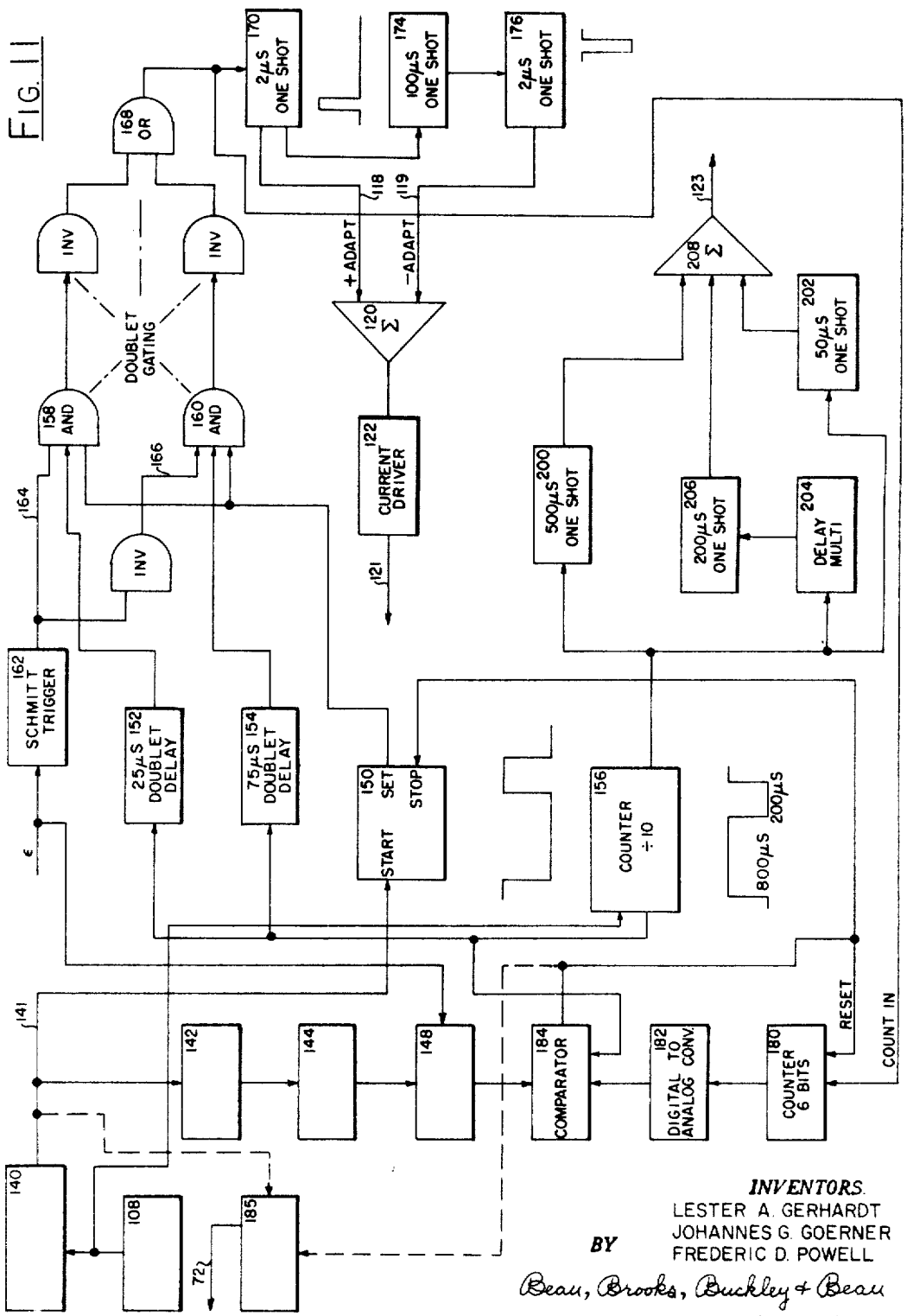

3,435,422
SELF-ORGANIZING SYSTEM
Lester A. Gerhardt, Tonawanda, Johannes G. Goerner, Buffalo, and Frederic D. Powell, Niagara Falls, N.Y., assignors to Bell Aerospace Corporation, Wheatfield, N.Y.
Filed June 27, 1966, Ser. No. 560,561
Int. Cl. G11b 13/00
U.S. Cl. 340—172.5        17 Claims

ABSTRACT OF THE DISCLOSURE

Self-organizing devices which are of distributed parameter form, i.e., all computations being distributed over a number of independent computing elements. These computing elements are variable gain elements which are adjusted as to their individual gains in accord with an algorithm employing the partial derivative of the square of an error signal with respect to the individual gains. The self-organizing devices may be employed in various systems in combination with entities having some established transfer function or intrinsic response to model the transfer function of the entity, to form the inverse of the transfer function of the entity, or to provide some desired transfer function in combination with the entity.

---

This invention relates to self-organizing devices, their internal structures, and their arrangements with other entities to produce specific desired results. By self-organizing devices is meant devices which are capable of automatically establishing a transducer function different from that which they originally possess in response to the requirements imposed upon them by the system within which they are organized.

The basic concept of self organizing devices is not new, it having long been recognized that a plurality of variable gain elements, each having an input, arranged to produce an output which is a function of the individual inputs and the respective gains may be used to effect a variable transfer function. The so-called pattern recognition devices are examples of such systems. In self-organizing devices the manner in which the individual gains are varied to achieve ultimately the desired transfer function is of paramount importance since the accuracy and stability of the device are dependent thereon. The act of effecting changes in the gains is called training, and the rule which governs the magnitude and sign of the gain changes is called the training algorithm or simply algorithm. Many types of training algorithms and attendant training have been proposed but none, to our knowledge, offers the combined features of accuracy, simplicity and stability comparable to the systems disclosed herein.

In what follows, the term trainable net will be used to designate an arrangement of variable gain elements and their output, the term self-organizing device will be used to designate one or more trainable nets having input means and means for effecting training, the term plant will be used as meaning an entity which has some established transfer function or impulsive response, and the term self organizing system or simply system will be used to designate an arrangement of a self-organizing device, or devices, with a plant, or plants characterized by the fact that the portion of the system which comprises the self-organizing device or devices responds to an output of the plant or plants to optimize some performance criterion or criteria for the system. The performance criterion may be simply the minimum of system error, for example.

Generally speaking, the present invention is directed to trainable nets, their incorporation within various self organizing devices, and the relationship of these devices with a plant or plants to provide a self-organizing system wherein error in system output may be minimized or other specific performance goals or criteria may be met. The class of self-organizing devices to which the present invention relates is that class characterized by utilization of trainable nets having a plurality of variable gain means arranged in parallel and having a cumulative output, the individual gains being adjusted or varied during a learning or training interval to achieve the desired transfer function. The variations in individual gains durng the learning interval are controlled in accord with the training algorithm in such fashion as to meet one or more performance criteria for the system arrangement.

We desire to provide self-organizing devices which are both accurate and stable while being at the same time of relative simplicity. Furthermore, it is our object to provide such devices which are parallel structured so that degradation of performance due to individual component failure is minimized. We have found that these objectives can be realized by using a particular algorithm in conjunction with parallel structured training nets provided that the trainable net or nets are so instrumented and arranged that the signals required for the algorithm are physically accessible. More specifically, we utilize an algorithm in which the rate of change of each trainable gain is proportional to the first partial derivative of some signal which represents the instantaneous value of a desired performance index with respect to the variable gains, in conjunction with a self-organizing device which renders these signals physically accessible.

We have also found that in self-organizing devices of the type herein contemplated, the trainable net or nets may be utilized in various arrangements with one or more unknown weighting functions or plants to produce outputs which minimize error in system output or satisfy other performance criteria only if we render physically accessible signals representing the partial derivatives, with respect to the individual variable gains, of the desired performance index in the system which is used to train the gains.

More specifically, it is an object of this invention to provide means whereby a system may be devised in which the combination of a self-organizing device and some plant is empowered to achieve a transfer function which, although initially unknown, is nevertheless arrived at in orderly, rapid and automatic fashion identical to operation of the system. Particularly, the system is so set up that a self-organizing device produces an output, in response to a particular input, which is compared with an externally controlled response for that input. The error signal, the amount by which the output for the self-organizing device differs from the external control output, is used to adjust the variable gains of the self-organizing devices so that they converge to steady state values yielding least mean squared error performance.

Fundamental building blocks according to the present invention are the combination of a plant and a self-organizing device in series and the combination of a plant and a self organizing device in parallel. In addition, this invention involves the concept of utilizing two identical self-organizing devices in combination wherein one of such devices is slaved to the other so that the variable gains of the two are in consonance. By using these several concepts individually and cumulatively, many types of self-organizing systems can be devised, all yielding least mean squared performance.

Within the confines of the preceding object, it is a further object to provide two basic types of self-organizing devices, an open loop device and a closed loop device, and of particular concern is the provision of self-organizing devices which are so arranged as to require a minimum of extraneous circuitry for deriving the requisite signals necessary for training. In this respect, it is of particular concern to provide a closed loop self-organizing device in which two trainable nets are arranged to share a common input, the forward loop net having an output from which the error signal is determined, and there being an auxiliary net having trainable gains to which the variable gains of the feedback net are ganged, wherein the auxiliary net is so arranged as to render physically accessible the requisite signals for its training.

A further object of this invention resides in the particularities of construction in a self-organizing device with specific reference to the use of multiaperture magnetic cores as the trainable gain elements of the trainable net or nets employed. Also, it is of concern to provide such a self-organizing device wherein a pair of magnetic logic cores are used in association with each multiaperture core.

In conformity with the preceding object, it is a further object of this invention to employ a multiaperture magnetic core as a trainable gain element. More specifically, it is an object of this invention to arranged multiampere magnetic core devices in such fashion as to receive input readout signals of sinusoidal form, in which the signal is a sinusoid of fixed frequency having peak amplitude excursions which are insufficient to overcome the switching threshold of the core so that non-destructive readout is effected. At the same time, the binary nature of the input readout signal is employed in conjunction with a binary pulse signal indicative of error sign to produce an amplitude excursion at either a positive or a negative peak of the signal used for readout sufficient to overcome the threshold of the core and cause partial switching thereof, this modified readout signal being applied to the core as an adapt or switching signal to modify its gain characteristics.

More specifically, the invention according to the preceding object utilizes a readout signal in which the two states are represented in sinusoids shifted 180° in phase which respect to each other, while the binary pulse signal comprises a pulse pair of opposite signs separated in time by one cycle of the sinusoid and arranged to coincide with successive peaks of the sinusoid having like signs; and in which the two states of the binary pulse signal are represented by pulse pairs shifted 180° in phase with respect to each other.

It is a further object of this invention to utilize a pair of magnetic core devices to superimpose the sinusoid and pulse pair signals described in the preceding object and thereby provide the adapt or switching signal for the multiaperture magnetic core with which they are associated.

Other objects and advantages of this invention will be apparent from the following specification and the accompanying drawings, wherein:

FIG. 1 is a diagram illustrating certain basic principles of the present invention;

FIG. 2 is a diagrammatic illustration of a self-organizing device according to this invention in function modeling mode with respect to some plant;

FIGS. 5 and 6 are block diagrams illustrating two basic modes of using the self-organizing devices according to this invention;

FIG. 10 is a circuit diagram partially in block form illustrating a preferred form of the invention;

FIG. 10a is a diagram illustrating the contents of the blocks 62, 63, 65, 67, 69, 71, 73 and 75 of FIGURE 10;

FIG. 11 illustrates the circuit diagram of the logic circuit illustrated in block form in FIGURE 10;

Figure 3:
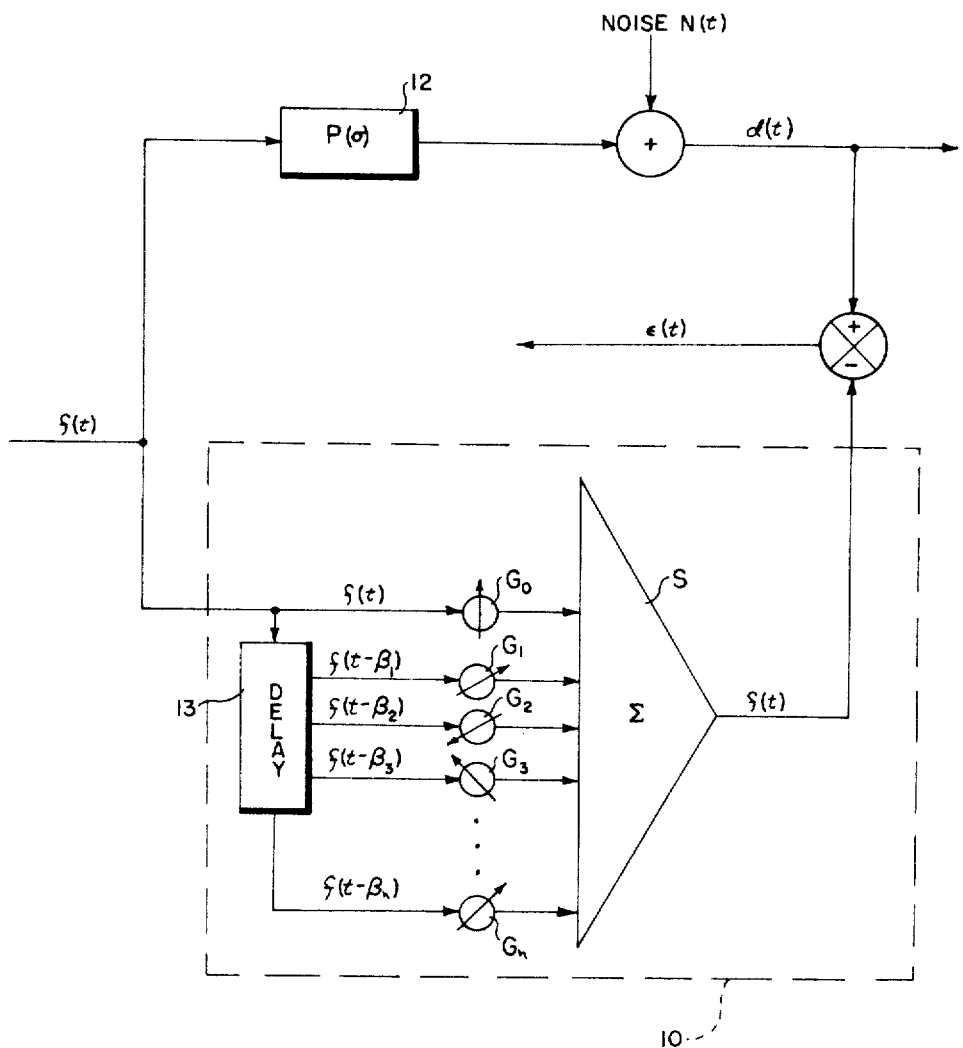
FIG. 3 is a diagram illustrating a special case of FIG. 2 in which the plant output is corrupted by additive noise and the input to the self-organizing device is a multi-tapped delay line.

In order to understand the principles of the present invention, reference is now had to FIGURE 1 wherein a trainable net, a basic building block of the present invention, is depicted. The basic unit shown comprises a plurality of variable-gain elements $G_0$; $G_1$; $G_2$; $G_3$ . . . $G_n$ having a pattern of individual inputs $f_0$ . . . $f_n$ respectively and having instantaneous gains $g_0$ . . . $g_n$ respectively so that the outputs of the variable gain elements are $f_i g_i$ where $i$ is 0 to $n$ for the respective gain elements. The outputs are summed at S to yield an output $$\delta = \sum_{i=0}^{n} f_i g_i$$

which, for any input pattern, is desired to equal the signal $d$ corresponding to that pattern. The amount by which the actual instantaneous output differs from the instantaneous desired value $d$ is represented by the instantaneous error $\epsilon$ as determined by the subtractor D. It can be shown that if the gains $g$ of the variable gain elements G are adjusted in accord with the algorithm:

(1) $$\dot{g}_j = -k_a \frac{\partial \epsilon^2}{\partial g_j} = -k_0 \epsilon \frac{\partial \epsilon}{\partial g_j}; \; k_0 = 2k_a$$

where:

$\dot{g}_j = \frac{d}{dt} g_j$ of each $j^{th}$ gain $k_a =$ a positive constant $\frac{\partial \epsilon^2}{\partial g_j} =$ the partial derivative of the error squared with respect to the gain for each input pattern.

the gains will converge to values yielding the least mean squared values of the error $\epsilon$.

Steady state is achieved when $\overline{\dot{g}_j} = 0$ for all $g_j$, where the bar implies average value.

The manner in which the error signal $\epsilon$ is used to effect the variations in the individual gains will be described later.

For the special case shown in FIGURE 1, it can also be shown that $\partial \epsilon^2 / \partial g_j = -2 f_j \epsilon$, so that the algorithm (Equation 1) may be rewritten, for the special case of FIGURE 1, as (2) $$\dot{g}_j = k_0 f_j \epsilon$$

This special form of the algorithm (Equation 2) permits the trainable net of FIGURE 1 to be arranged in a self organizing device of the type enclosed in the dashed line box 10 shown in FIGURE 2 to model the unknown transfer function or impulsive response $P(\sigma)$ of some linear, stable and possibly non-stationary plant 12, with least mean squared error. In FIGURE 2, an input signal $f(t)$, a function of time for the purpose of illustration, is applied to the unknown plant 12 and is also applied directly to the first variable gain element $G_0$ of the trainable net which forms part of the self organizing device 10. The input signal is also applied to a series of networks $N_1$; $N_2$ . . . $N_n$ coupled to the respective variable gain elements $G_1$; $G_2$ . . . $G_n$ so that the inputs to the variable gain elements form a pattern related to the input signal $f(t)$. The summed output $\delta(t)$ of these gain elements is compared with the output $d(t)$ of the unknown plant 12 to provide the error signal $\epsilon(t)$ as shown. The error signal $\epsilon(t)$ and the inputs to the trainable gains G are used to adjust the gains $g$ of the variable gain elements G in accord with the algorithm represented by Equation 2.

To appreciate better the significance of FIGURE 2, reference is now had to FIGURE 3. In FIGURE 3, the unknown plant 12 is, as in FIGURE 2, a linear, stable plant which may be time-varying and whose output is corrupted by noise $N(t)$, as symbolically indicated, to produce the noise-corrupted output $d(t)$. The spectra of the input signal $f(t)$ and the noise $N(t)$ may also be time-varying. The input signal $f(t)$, a function of time, is applied to a tapped delay line 13 to form the input pattern for the variable gain elements G which, when summed, yield the output:

$$\delta(t) = \sum_{i=0}^{n} g_i f(t - \beta_i)$$

where:

$\beta_i$ are the delays (not necessarily uniform), and
$g_i$ are the individual gains.

Since $$\epsilon(t) = d(t) - \delta(t) = d(t) - \sum_{i=0}^{n} g_i f(t - \beta_i)$$

$$\frac{\partial \epsilon(t)}{\partial g_j} = -f(t - \beta_j)$$

so that the training algorithm of Equation 2 is:

(4) $\qquad \dot{g}_j = k_0 f(t - \beta_j) \epsilon(t)$

The output of the plant 12 is:

(5) $\qquad \int_0^\infty P(\sigma) f(t - \sigma) d\sigma$ so that, from Equations 3 and 5 and FIGURE 3, the error is:

(6)

$$\epsilon(t) = N(t) + \int_0^\infty P(\sigma) f(t - \sigma) d\sigma - \sum_{i=0}^{n} f(t - \beta_i) g_i$$

Substituting Equation 6 into Equation 4 and rewriting yields:

(7)

$$\frac{1}{k_0} \dot{g}_j(t) + \sum_{i=0}^{n} f(t - \beta_i) f(t - \beta_j) g_i =$$
$$\int_0^\infty P(\sigma) f(t - \sigma) f(t - \beta_j) d\sigma + f(t - \beta_j) N(t)$$

If $k_0$ is chosen small enough so that $[k_0(n+1)\sigma_f^2]^{-1}$ is large compared to unity and also compared to the autocorrelation time constants of $f(t)$ and $N(t)$, where $n+1$ is the number of trainable gain elements G and $\sigma_f$ is the standard deviation of $f(t)$ then the products approach their average values, i.e., the autocorrelation function, and Equation 7 becomes:

(8)

$$\sum_{i=0}^{n} \phi_t(\beta_i - \beta_j) g_i = \int_0^\infty P(\sigma) \phi_t(\sigma - \beta_j) d\sigma + \overline{f(t - \beta_j) N(t)}; j=0, 1, 2 \ldots n$$

where $\phi(\beta_i - \beta_j)$ is the autocorrelation function of the input signal $f(t)$ at a lag of $(\beta_i - \beta_j)$ seconds. If the signal $f(t)$ and noise are uncorrelated, the cross-correlation terms $$\overline{f(t - B_j) N(t)}$$

vanish, whereas if they are correlated the gains $g_i$ accommodate to that fact.

When the system of FIGURE 3 is fully trained the error $\epsilon(t)$ is approximately equal to the noise $N(t)$ and is uncorrelated to the input $f(t)$ if the noise $N(t)$ is likewise uncorrelated to the input $f(t)$. That is to say, the noise and output of the plant are separated with least mean squared error.

Figure 4:
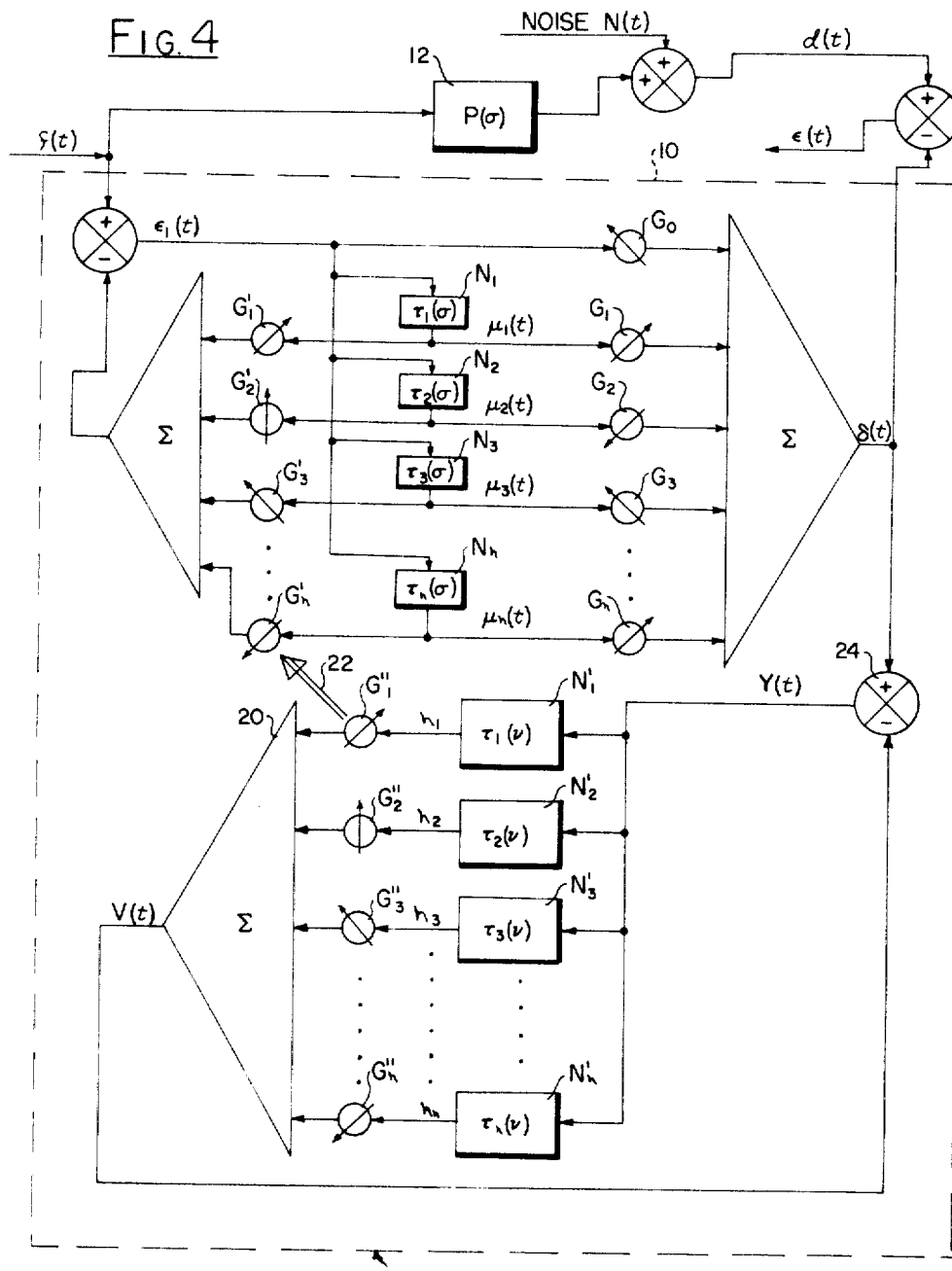
FIG. 4 is a diagram illustrating a closed loop self-organizing device arranged with a plant to form a self-organizing system.

The systems of FIGURES 2 and 3 are not, however, devoid of limitation and, in comparison thereto, the system of FIGURE 4 yields greatly superior performance. As has been stated before, a problem to which the present invention is primarily addressed is the arrangement of trainable nets in such fashion as to establish, at physically accessible points therein, signals representing the partial derivatives necessary for training in accord with the algorithm of Equation 1. That this is possible with the configuration of FIGURE 4 for both the forward and feedback loops will now be demonstrated.

In FIGURE 4, a closed loop self organizing system consisting of two sets of trainable gains $G_0 \ldots G_n$ and $G'_1 \ldots G'_n$ having respective individual instantaneous gains $g_0 \ldots g_n$ and $g'_1 \ldots g'_n$ is used to model the unknown plant 12. To generalize as in the case of FIGURE 2, the input patterns to the gain elements are provided by networks $N_1 \ldots N_n$ whose input, in the case of FIGURE 4, is the internal error signal $\epsilon_1$. For the forward loop, the gain elements G are, like the systems of FIGURES 2 and 3, trained in accord with the form of algorithm defined by Equation 1 so that, as before:

(9) $\qquad \dot{g}_j = -k_a \frac{\partial \epsilon(t)^2}{\partial g_j} = -k_0 \epsilon(t) \frac{\partial \epsilon(t)}{\partial g_j}; \; k_0 = 2k_a > 0$

(10) $\qquad \epsilon(t) = d(t) - \delta(t)$ and since (11)

$$\delta(t) = \sum_{i=0}^{n} g_i \int_0^\infty \tau_i(\sigma) \epsilon_1(t - \sigma) d\sigma$$

where $g_i$ are the gains of the elements $G_0 \ldots G_n$ and $\tau_i(\sigma)$ is the impulsive response of network $N_i$, Equation 10 may be written:

(12)

$$\epsilon(t) = d(t) - \sum_{i=0}^{n} g_i \int_0^\infty \tau_i(\sigma) \epsilon_1(t - \sigma) d\sigma$$

from which the partial derivative $\partial \epsilon(t) / \partial g_j$ is:

(13) $\qquad \frac{\partial \epsilon(t)}{\partial g_j} = -\int_0^\infty \tau_j(\sigma) \epsilon_1(t - \sigma) d\sigma$ Referring back to the algorithm of Equation 9, and considering FIGURE 4, the error term $\epsilon(t)$ is, of course, available in FIGURE 4 and since the output of any network $N_j$ is equal, by inspection of FIGURE 4, to $$\int_0^\infty \tau_j(\sigma) \epsilon_1(t - \sigma) d\sigma$$

it is obvious from Equation 13 that the partial derivative terms $\partial \epsilon(t) / \partial g_j$ of Equation 9 are also available in FIGURE 4 as the outputs $u_j(t)$ of the networks N. Thus, the algorithm of Equation 9 may be instrumented for the forward loop gain elements G.

For the feedback loop gain elements G', the algorithm of Equation 9 takes the form $\dot{g}'_j = -k_0 \epsilon(t) \partial \epsilon(t) / \partial g'_j$. Since the input signal $f(t)$ is not a function of the gains $g'$ of the feedback loop gain elements, the forward loop gains $g$ are independent variables, the networks N are independent of the gains $g'$, and the output of the plant 12 is independent of the gains $g'$, the partial derivative $\partial \epsilon(t) / \partial g'_j$ may be written:

(14) $\qquad \frac{\partial \epsilon(t)}{\partial g'_j} = \frac{\partial}{\partial g'_j} [d(t) - \delta(t)] = -\frac{\partial \delta(t)}{\partial g'_j}$ where $g'_j$ are the gains of the elements $G'_0 \ldots G'_n$.

Partially differentiating Equation 11 and substituting in Equation 14 yields:

(15) $\qquad \frac{\partial \epsilon(t)}{\partial g'_j} = -\sum_{i=0}^{n} g_i \int_0^\infty \tau_i(\sigma) \frac{\partial \epsilon_1(t - \sigma)}{\partial g'_j} d\sigma$ From FIGURE 4, it will be evident that $$\epsilon_1(t) = f(t) - \rho(t)$$

so that $\epsilon_1(t-\sigma) = f(t-\sigma) - \rho(t-\sigma)$, and

(16)
$$\frac{\partial \epsilon_1(t-\sigma)}{\partial g'_j} = -\frac{\partial \rho(t-\sigma)}{\partial g'_j}$$

From FIGURE 4:

(17)
$$\rho(t) = \sum_{k=1}^{n} g'_k \int_0^\infty \tau_k(\nu) \epsilon_1(t-\nu) d\nu$$

where the impulsive response of the $k$th network N is written as $\tau_k(\nu)$.

From Equation 17:

(18)
$$\rho(t-\sigma) = \sum_{k=1}^{n} g'_k \int_0^\infty \tau_k(\nu) \epsilon_1(t-\nu-\sigma) d\nu$$

Combining (16) and (18) and substituting in Equation 15 yields:

(19)
$$\frac{\partial \epsilon(t)}{\partial g'_j} = \sum_{i=0}^{n} g_i \int_0^\infty \tau_i(\sigma) \frac{\partial}{\partial g'_j} \left[ \sum_{k=1}^{n} g'_k \int_0^\infty \tau_k(\nu) \epsilon_1(t-\nu-\sigma) d\nu \right] d\sigma$$

and carrying out the partial differentiation:

(20)
$$\frac{\partial \epsilon(t)}{\partial g'_j} = \sum_{i=0}^{n} g_i \int_0^\infty \tau_i(\sigma) \left[ \int_0^\infty \tau_k(\nu) \epsilon_1(t-\nu-\sigma) d\nu + \sum_{k=1}^{n} g'_k \int_0^\infty \tau_k(\nu) \frac{\partial \epsilon_1(t-\nu-\sigma)}{\partial g'_j} d\nu \right] d\sigma$$

Interchanging the order of summation and integration yields:

(21)
$$\frac{\partial \epsilon(t)}{\partial g'_j} = \int_0^\infty \tau_k(\nu) \left[ \sum_{i=0}^{n} g_i \int_0^\infty (\sigma) \epsilon_1(t-\nu-\sigma) d\sigma + \sum_{k=1}^{n} g'_k \sum_{i=0}^{n} g_i \int_0^\infty \tau_i(\sigma) \frac{\partial \epsilon_1(t-\nu-\sigma)}{\partial g'_j} d\sigma \right] d\nu$$

Substituting Equation 11 into Equation 21 yields:

(22)
$$\frac{\partial \epsilon(t)}{\partial g'_j} = \int_0^\infty \tau_k(\nu) \delta(t-\nu) d\nu + \sum_{k=1}^{n} g'_k \int_0^\infty \tau_k(\nu) \frac{\partial \delta(t-\nu)}{\partial g'_j} d\nu$$

Partially differentiating Equation 10 with respect to the feedback gains $g'_j$ and substituting into Equation 22,

(23)
$$\frac{\partial \epsilon(t)}{\partial g'_j} = \int_0^\infty \tau_k(\nu) \delta(t-\nu) d\nu - \sum_{k=1}^{n} g'_k \int_0^\infty \tau_k(\nu) \frac{\partial \epsilon(t-\nu)}{\partial g'_j} d\nu$$

$$\frac{\partial \epsilon(t)}{\partial g'_j}$$

Equation 23 indicates the nature of the signals $\partial \epsilon(t)/\partial g'_j$ and since these signals are nowhere physically accessible within the closed loop system defined by the sets of gain elements G and G', it remains to provide some external means which provides these signals in physically accessible form. One such means is shown in the lower portion of FIGURE 4 which will be seen to comprise the variable gain elements $G''_1 \ldots G''_n$ having respective variable gains $g''_1 \ldots g''_n$ provided with the summing means 20.

The individual gain elements G' of the feedback trainable net are ganged to corresponding gain elements G'' of the auxiliary trainable net, as symbolized by the double barred arrow 22 in FIGURE 4, so that $g'_i = g''_i$ and $\dot{g}'_i = \dot{g}''_i$ for all $i = 1, 2 \ldots n$. The input Y(t) to the auxiliary net is the difference between the forward loop net output and the output V(t) of the auxiliary net, as obtained at the comparator 24, and this signal is applied to the lag networks $N'_k$ having individual impulsive responses $\tau_k(\nu)$ and outputs $n_k$ which are applied to the individual gain elements $G''_k$. With this configuration, the feedback and auxiliary trainable nets are identical and the outputs $n_j$ of the network $N'_1 \ldots N'_n$ will be $$\partial \epsilon(t)/\partial g'_j$$

so that the gains G'' may be trained according to the algorithm $\dot{g}''_j = \dot{g}'_j = -k_0 \epsilon(t) \partial \epsilon(t)/\partial g'_j$.

Figure 4A:
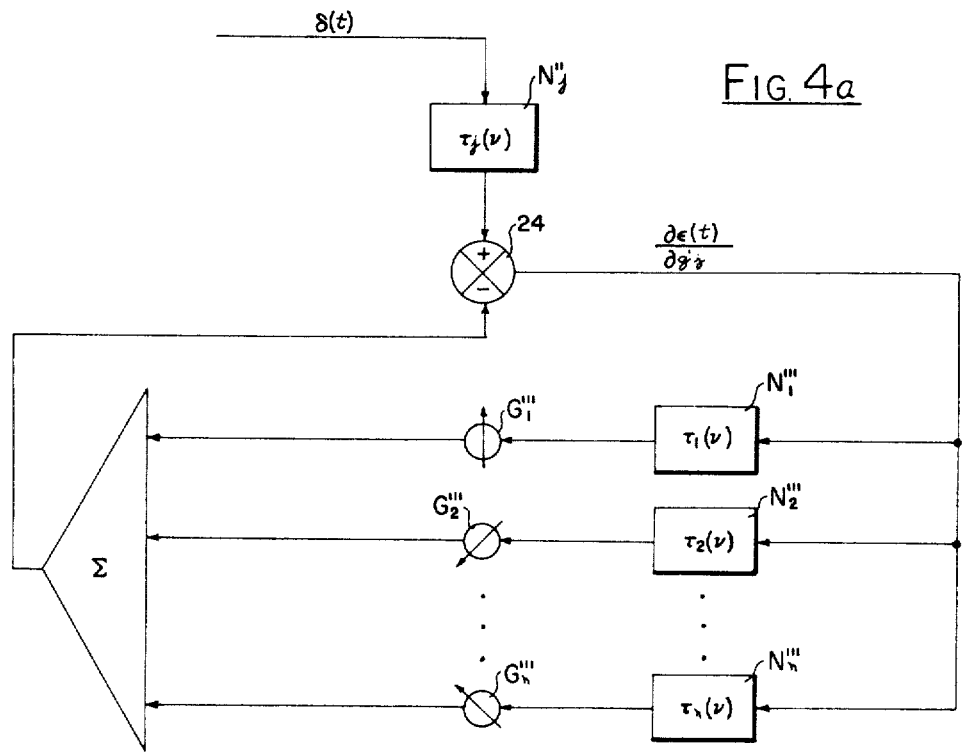
FIGS. 4a and 4b are diagrams for explaining the configuration of FIG. 4.
Figure 4B:
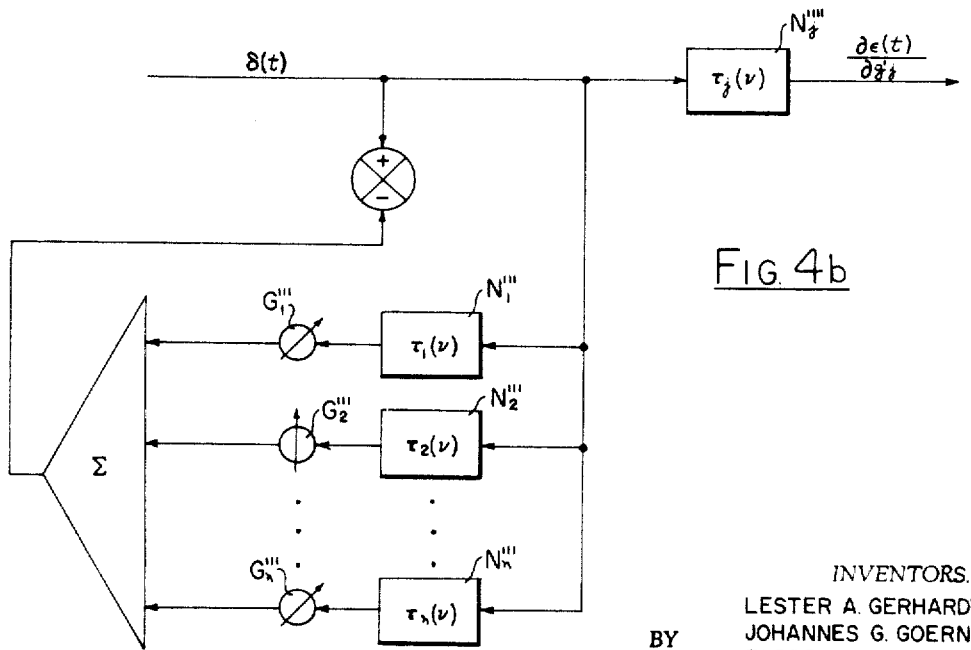

The physical significance of Equation 23 may be understood by reference to FIGURES 4, 4a and 4b. In FIGURE 4a, the output $\delta(t)$ of the forward loop trainable net is passed through the filter $N''_j$ having impulsive response $\tau_j(\nu)$ and thence to the comparator 24 whose output shall be $\partial \epsilon(t)/\partial g'_j$. This partial derivative then passes through a family of filters $N'''_k$ and then through an associated family of gains G''' having individual gains $g'_k$ and whose outputs are summed to form $$\sum_{k=1}^{n} g'_k \int_0^\infty \tau_k(\nu) \frac{\partial \epsilon(t-\nu)}{\partial g'_j} d\nu$$

This sum is then subtracted at the comparator 24 from the signal $$\int_0^\infty \tau_k(\nu) \delta(t-\nu) d\nu$$

thus satisfying Equation 23 so that the output of the comparison point is in fact $\partial \epsilon(t)/\partial g'_j$. Now, since all the networks are time invariant, the input filter $N''_j$ may be replaced by an output filter $N''''_j$ as shown in FIGURE 4b. However, the output filter $N''''_j$ is one of the set of filters N''' so that the output of $N'''_j$ is identical with the output of $N''''_j$ and may be used instead, thus yielding the final configuration shown in FIGURE 4 which may be instrumented to yield the partial derivative $\partial \epsilon(t)/\partial g'_j$ at the output of the filter $N'_j$.

To summarize the disclosure to this point, two basic types of self-organizing devices have been illustrated (FIGURES 2, 3 and FIGURE 4) which are pattern recognition devices operating as function modelers. Identical open loop self organizing devices are indicated within the dashed-line boxes 10 of FIGURES 2 and 3, whereas a closed loop type is indicated within the dashed-line box 10 of FIGURE 4. In the systems of FIGURES 2 and 3, zero error performance is limited to plants having real poles whereas this limitation does not exist for the system of FIGURE 4 which can under all circumstances perform as well as or better than the system of FIGURES 2 and 3. As has been demonstrated, both systems are easily instrumented, and the choice of system is dependent upon the nature of the unknown plant and the required precision of performance.

In the system of FIGURE 4, a plant having $n$ or less energy storage elements or equivalently, having a transfer function containing $n$ or less differentiations, can be exactly identified or modeled if the self-organizing device has $2n$ networks N and $2n+1$ trainable gains $g$. If the plant has more than $n$ storage elements, or a transfer function having more than $n$ differentiations, the system of FIGURE 4 will identify the plant with least mean squared error.

For convenience in what immediately follows, the symbolism depicted in FIGURE 5 will be used. FIGURE 5 is equivalent to any of FIGURES 2–4 in which the unknown plant is identified by the box designated P and the self-organizing devices enclosed in dashed-line boxes 10 in FIGURES 2–4 are identified by the box designated $L_m$; the error term $\epsilon(t)$ being used to train the gains of the variable gain elements. The symbolism of FIGURE 5, then, denotes the function modeling mode discussed above. In FIGURE 6, however, function inversion takes place, i.e., the system $L_1$ effects the physically realizable inverse of the plant P.

The general configurations shown in FIGURES 5 and 6 are important building blocks of the present invention inasmuch as they individually, in combination, and in conjunction with coupling techniques discussed below, permit of many and varied systems. For clarity and consistency, self-organizing devices disposed in function modeling mode will be denoted by the subscript $m$ while devices disposed in function inversion mode will be denoted by the subscript $i$. Further, the error signal used for training self-organizing devices in the function modeling mode will be designated $\epsilon(t)$ while that used for training self organizing devices in the function inverting mode will be designated $\epsilon_0(t)$. The dashed line connections of $\epsilon(t)$ and $\epsilon_0(t)$ to the corresponding self organizing devices $L_m$ and $L_i$ in FIGURES 5 and 6 denote utilization of these signals for training.

Coupling or ganging the variable gain elements of two trainable nets will be depicted by double barred arrows such as that used in FIGURE 4 and will designate that the variable gain elements of one net are ganged to corresponding variable gain elements of the other net so that the individual gains of one are equal to the individual gains of the other.

Figure 7:
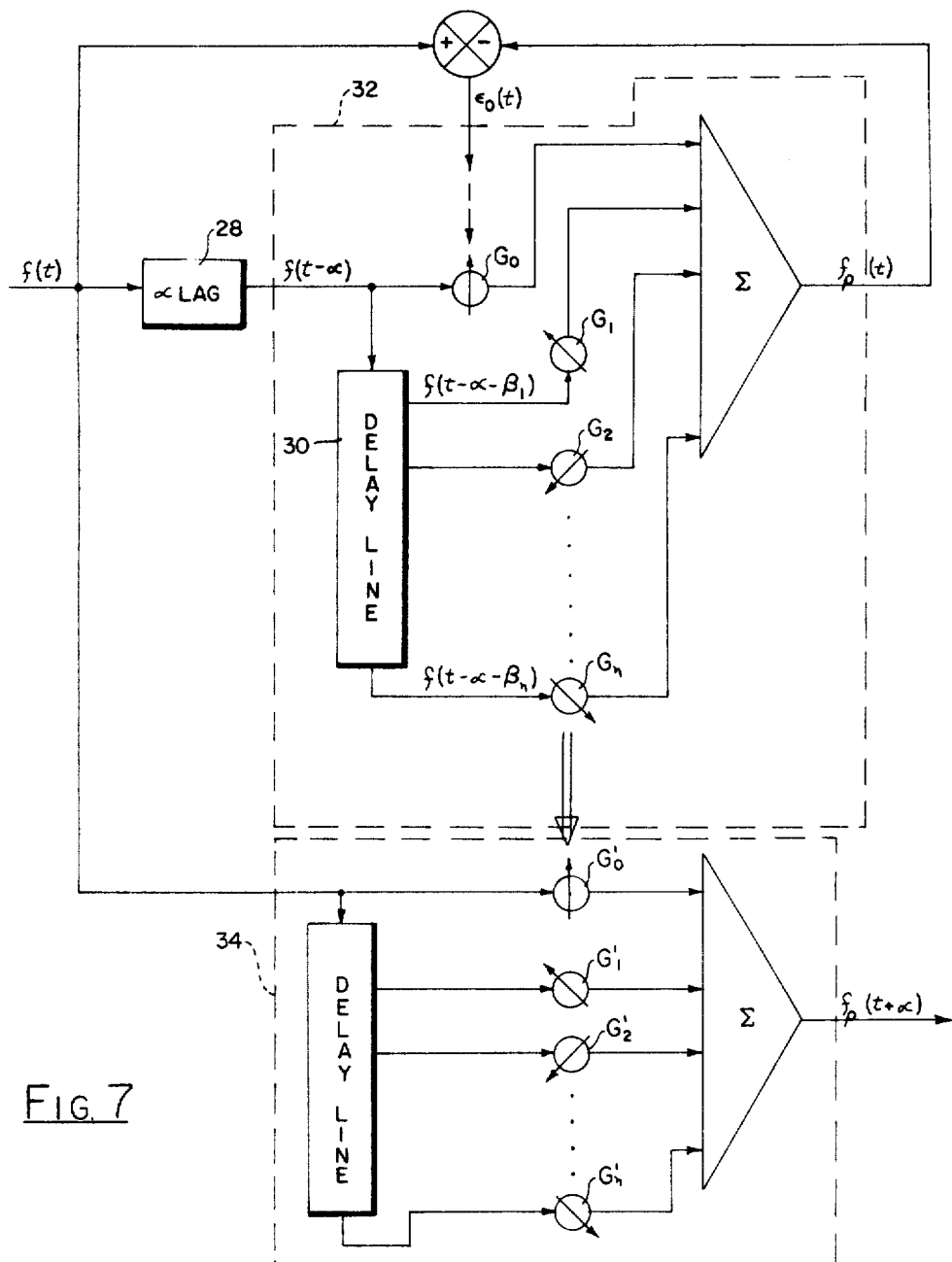
FIG. 7 is a diagram illustrating a predictor constructed according to this invention.

To illustrate a specific application of some of the principles of this invention, reference is had to FIGURE 7 wherein the system shown is adapted to provide an output signal which is the prediction, based upon the past history of the input signal, of the input signal at some finite future time. The continuous input signal $f(t)$ is applied to a delay 28 of $\alpha$ seconds and this delayed signal is applied to a delay line 30 to provide $n$ different delay intervals which, together with the delayed input $f(t-\alpha)$ form the $n+1$ components of an input pattern for predicting the input signal $\alpha$ seconds in the future. The inputs to the variable gain elements G are $f(t-\alpha-\beta_i)$; $i=0, 1, 2 \ldots n$. The summed output of the variable gain elements is

(24)
$$f_p(t) = \sum_{i=0}^{n} g_i f(t-\alpha-\beta_i)$$

That is to say, the self-organizing device enclosed by the dashed-line box 32 is in postfilter configuration with respect to the $\alpha$ second lag (plant) and forms the inverse of the plant so that the output $f_p(t)$ of the self organizing device is the $\alpha$ second prediction of its input signal $f(t-\alpha)$. The self-organizing device 32 is trained in accord with the algorithm of Equation 9, the signals for which are accessible, and its output $f_p(t)$ is used only to derive the error signal $\epsilon_0(t)$, since the output $f_p(t)$ is merely the prediction of the present using the past. However, by ganging the gain elements G' on the corresponding elements G, as symbolically represented by the dashed-lines in FIGURE 8, the output of the self-organizing device 34 is also the $\alpha$ second prediction of its input.

However, the input signal to the slaved device 34 is $f(t)$, the present, so that its output is $f_p(t+\alpha)$, the $\alpha$ second prediction of the future. The self-organizing device 32 of FIGURE 7 is, of course, the open loop form discussed above, but it will be appreciated that the closed loop form (FIGURE 4) may also be used.

Reverting to the symbolism of FIGURES 5 and 6, some applications of the principles of the present invention dynamical systems follows.

Figure 8:
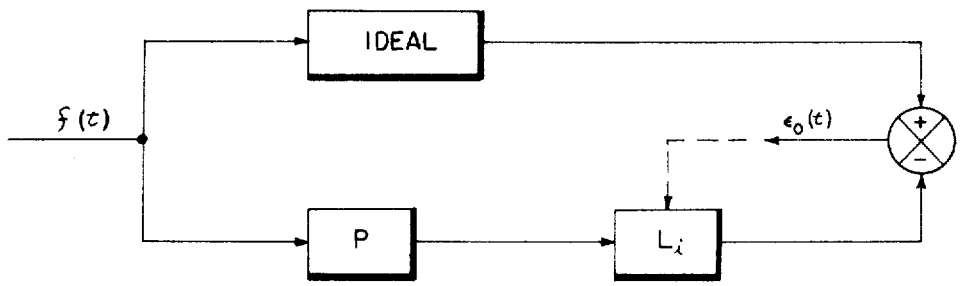
FIGS. 8 and 9 illustrate dynamical self-organizing systems according to this invention.

In FIGURE 8, the system shown is directed to a problem common in dynamical system work, namely, to provide a plant-filter combination which has a specified transfer function. In FIGURE 8, the specified transfer function is linear and realizable and is designated "Ideal," whereas the plant P has a transfer function $\rho(\omega)$ and impulsive response $P(\sigma)$. The self organizing device $L_1$ is in series with, and follows the plant, hence is in the inversion mode and is trained according to the algorithm of Equation 9 to yield least mean squared error performance.

Figure 9:
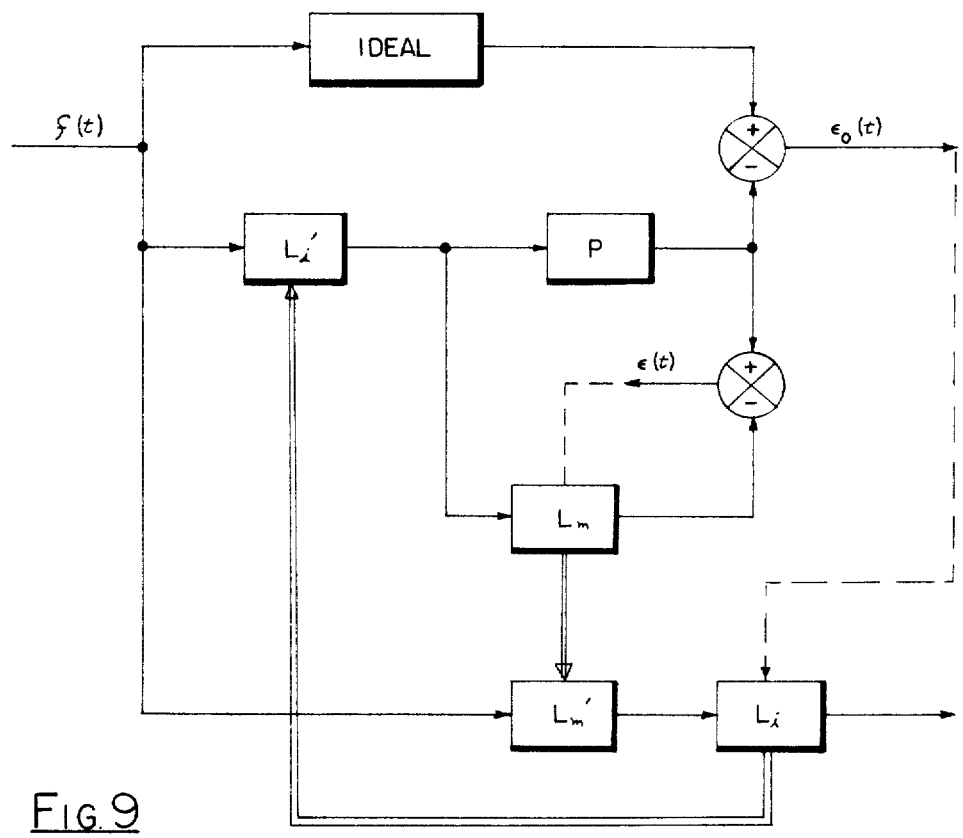

It is important to note that the signals necessary for utilizing the algorithm of Equation 9 are accessible in the configurations shown in FIGURES 6 and 8, but would not be accessible were the self organizing device $L_1$ to precede the plant P. That is to say, an important property of the class of self organizing systems employed herein is that all dynamical elements of the system must precede the trainable gains if least mean squared error performance is to be achieved. To remove this restriction, the function modeling concept of FIGURE 5 together with coupling techniques is used. To illustrate, reference is had to FIGURE 9. In FIGURE 9, it is desired that the plant P and some self-organizing device simulate the output of the ideal, that is, that the plant-filter combination have a transfer function approaching that of the ideal. However, unlike the configuration of FIGURE 8, the system of FIGURE 9 requires the self organizing device to precede the plant P and for this purpose, the self-organizing device $L_1'$ is provided.

The signals necessary to train the self-organizing device $L_1'$ are not physically accessible within this device because it precedes the plant P, so the simulated plant $L_m'$ is provided which is followed by the self-organizing device $L_1$ to which the self-organizing device $L_1'$ is ganged or coupled as indicated by the double barred arrow connecting these devices. To provide the simulated plant $L_m'$, the self-organizing device $L_m$ is placed in function modelling mode with respect to the plant P and trained in accord with the algorithm of Equation 9 from the error term $\epsilon(t)$ and the partial derivative signals as previously explained. The self-organizing device $L_m'$ is ganged or coupled to the device $L_m$ and is thus identical thereto. Since the self-organizing device $L_m$ identifies the plant P with least mean squared error, the self-organizing device $L_m'$ and the self-organizing device $L_1$ respectively simulate the plant P and a self-organizing device in the postfilter position wherein the necessary partial derivative signals are physically accessible. The self organizing device $L_1$ is, then, trained with these partial derivative signals and the error signal $\epsilon_0(t)$ which is the difference between the ideal and plant outputs. The output of the self organizing device $L_1$ need not be used. The prefilter $L_1'$ is correctly trained because it is ganged to and identical with the postfilter device $L_1$.

As an example of a practical circuit embodying the principles of this invention, attention is directed to FIGURES 10–13. FIGURE 10 is a somewhat simplified block diagram to illustrate broadly the principles involved and in which the inputs to the self-organizing device are indicated by reference characters 60. In FIGURE 10, the blocks designated by reference characters 62 represent an input storage mechanism, a converting switch and the analog storage mechanism and entities comprising these blocks 62 are shown in more particularity and detail in FIGURE 10a and are referenced therein respectively by reference characters 107, 114 and 100. In the specific embodiment shown, there are six such blocks 62 and they consequently represent the 6-bit digital equivalent of the input pattern at the present time. The next subsequent set of blocks 63 represent the digital equivalent of the input pattern properly delayed by one shift interval. Blocks 65 represent the digital equivalent of the pattern properly delayed by two shift intervals, and so forth, for the subsequent groups of blocks 67, 69, 71, 73 and 75, it being appreciated that the specific number of such blocks and arrangement therefore of as will hereinafter appear may be altered to accept different input formats, for example a wholly serial input pattern having more or less than 48 bits. It will be appreciated also, of course, that the various blocks 62, 63, 65, 67, 69, 71, 73 and 75 are all equivalent and conform to the configuration shown in FIGURE 10.

Each one of the inputs 60 is applied directly to a respective block 62 as shown in FIGURE 10 and each such input is applied to an inverting amplifier 64 whose output forms another input 66 to a respective block 62. As is also shown in FIGURE 10, a master oscillator and inverter 108 is provided which supplies 0° and 180° sinusoids respectively to conductors 110 and 112 which are applied to a buffer amplifier 140 having 0° and 180° outputs with conductors 116 and 117 respectively which, as shown, are applied as additional inputs to each of the blocks 62 as well as to all of the other blocks 63, 65, 67, 69, 71, 73 and 75.

In FIGURE 10, a block indicated by the reference character 68 represents logic circuitry which also provides inputs to the blocks 62, 63, 65, 67, 69, 71, 73 and 75. This logic circuitry 68 is shown in detail in FIGURE 11. For sake of clarity in FIGURE 10, a single output from the logic circuitry 68 is designated by the reference character 70 but as will appear hereinafter with reference to the specific description of FIGURE 11, this output 70 actually comprises four separate and distinct signals to the blocks 62. In addition, a shift signal is applied from the logic circuitry 68 by means of conductor 72 and is applied as a shift input to each of the blocks 62.

The outputs from each of the blocks 62, 63, 65, 67, 69, 71, 73 and 75, as designated by the reference characters 128, are the outputs of the individual variable gain elements which are applied to the summing amplifier 130 whose output at 131 is applied to an output average and gating circuit 132, the output 133 of which is applied to a summing amplifier 74 having, in addition to the input 133 a dynamic bias input 76. A bias voltage is required to be added to the output to account for the non-symmetry of the core characteristic about a zero reference. The averaged output of any core 102 varies from some positive potential to some small positive potential. Assuming the midpoint voltage of this characteristic is designated $g_0$, with an input $f_i$ for the $i$th core, the summed output of the cores 102 is $$\delta = \sum_{i=0}^{n} f_i(g_0 + \Delta g_i)$$

where $\Delta q_i$ is the gain of the $i$th core as measured from the reference $g_0$. The above equation reduces to $$\delta = g_0 \sum_{i=0}^{n} f_i + \sum_{i=0}^{n} f_i \Delta g_i$$

If an amount equal to $$-g_0 \sum_{i=0}^{n} f_i$$

is added to the output, the core characteristic would appear to fluctuate about zero with $\Delta g_i$ now representing just $g_i$ since the reference is zero. The term $$-g_0 \sum_{i=0}^{n} f_i$$

is the dynamic bias. It is termed dynamic since as the $f_i$'s change the bias compensation required changes accordingly.

The algebraically summed output 78 of these two signals 76 and 133 is the system output as identified in FIGURE 10. The system output is compared to a goal objective $d$ in difference amplifier 134, the output of which is the system error $\epsilon$. The system output 78 is also used as identification of the ability of the system to classify its inputs at any particular point in time. The error signal $\epsilon$ is, as shown in FIGURE 10, applied as an input to the logic circuitry 68. In addition, there is an input 80 to the logic circuitry 68 which is identical with the 0° phase output 110 of the master oscillator and inverter 108 and which constitutes a fundamental timing signal for the logic circuitry.

In the circuitry in the specific embodiment shown in FIGURE 10, the input is assumed to be a 6-bit serial digital signal and as a consequence, the input mechanism is devised so as to perform as a digital delay line. Thus, the outputs of the storage elements of the blocks 62 are fed in series to the subsequent blocks 62 and are represented by the signals 82 and 84 which correspond, for the blocks 63 to the input signals 60 and 66 to the blocks 62. The blocks 65 in turn receive corresponding inputs 86 and 88 from the blocks 63, and so forth, as will be clear from FIGURE 10.

Figure 13:
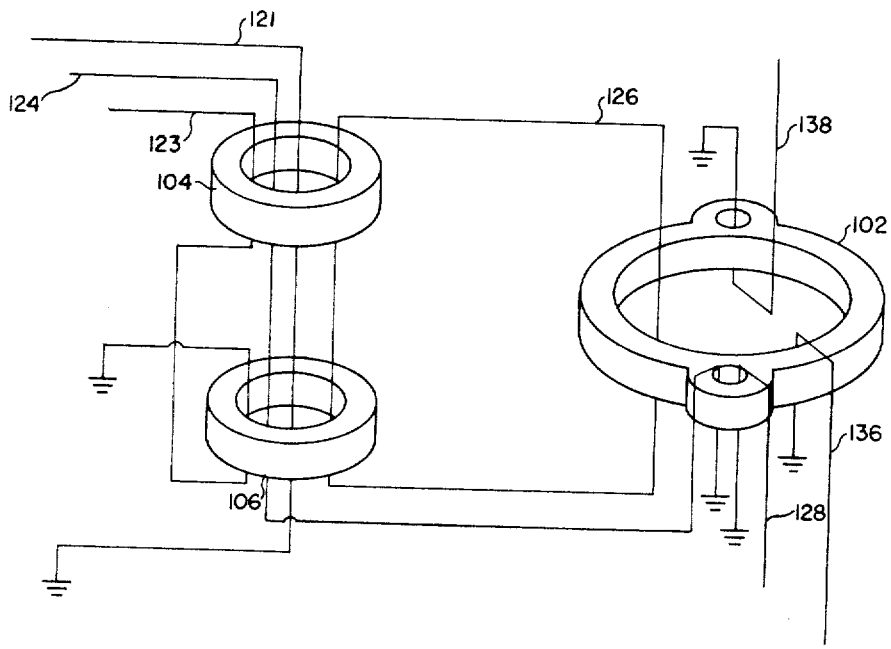
FIG. 13 illustrates one of the multiaperture magnetic cores and its associated logic cores which provide the trainable gain elements of the present invention.

From FIGURE 10 it will be seen that the self-organizing device embodies 48 separate trainable gain elements, one of which is indicated generally by the reference character 100 in FIGURE 10a. The trainable gain elements each consist of a multiaperture magnetic core 102 as shown in FIGURE 13. Associated with each multiaperture core is a pair of toroidal magnetic cores 104 and 106 whose functions will be more fully described hereinafter. Each multiaperture magnetic core 102 is constructed of square hysteresis loop material such as ferrite, and the input signal to each core is coupled to the core through its minor aperture so as to constitute an input readout signal which, as will be seen hereinafter, is always of insufficient magnitude to effect switching the state of the core about the major aperture. In this fashion, nondestructive readout is achieved. Partial switching in each multiaperture core, in order to provide the variable gain characteristics, is accomplished by adapt signals coupled to each core through its major aperture. The adapt signals are of sufficient amplitude to overcome the threshold of the core but are of short time duration so that the voltage-time product is effective to switch the core only partially. In this way, the domain wall in each core is moved in finite steps either to increase or decrease the flux level of the core 102 dependent upon the polarity of the adapt signal so that multilevel storage is accomplished. Each multiaperture core operates as a bidirectional variable gain device, the gain being determined by the flux level of the core 102.

The input readout signal for each core is a sinusoid of fixed frequency and of either 0° or 180° phase which is of insufficient amplitude to cause core switching. For this purpose, the master oscillator and inverter 108 is provided having the mentioned 0° and 180° phase outputs at the conductors 110 and 112 respectively. These signals, buffered by 140, and designated by reference characters 116 and 117 respectively in this form, are applied to the switches 114, by conductor 116 and 117 as shown in FIGURE 10a, a pair of which is provided for each multiaperture core 102. Dependent upon the states of the switches 114 as determined by the input for that switch on conductors 90 and 92 from the respective storage register flip-flop 107, the input to the minor aperture on conductor 124 of each core will be either the 0° or 180° phase signal present at the conductors 116 and 117.

Figure 12:
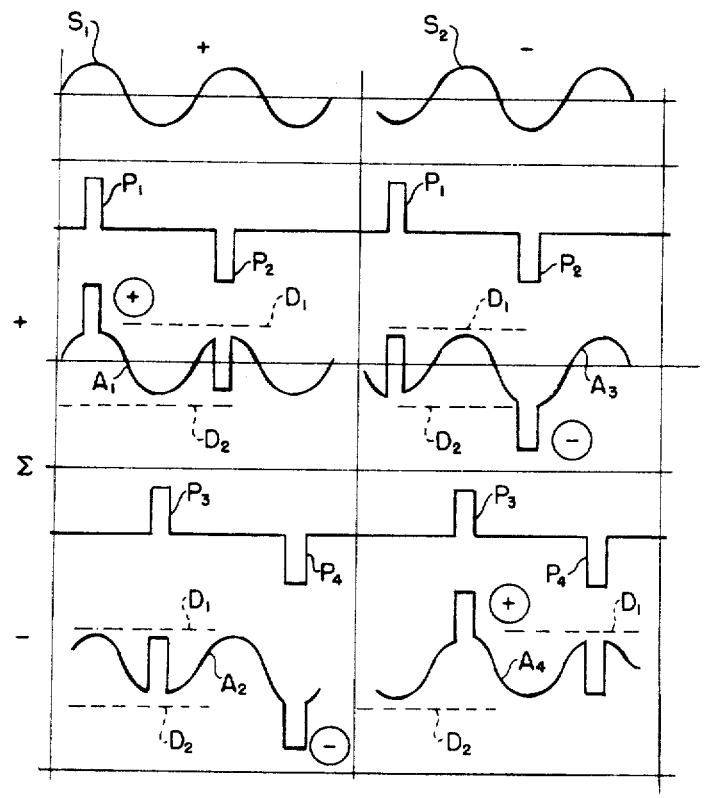
FIG. 12 is a diagram illustrating waveforms used to implement the algorithm logic.

As will be seen later, the presence of an error signal $\epsilon$ will produce a pulse pair, the first positive and the second negative, which are separated in time by an amount equal to the period of the master oscillator frequency. Further, dependent upon the sign of the error signal, the pulse pairs will be phased differently with respect to the master oscillator signal. This relationship is shown in FIGURE 12. On the left hand side in this figure, the zero phase sinusoid signal is shown in its possible relationships with the pulse pairs, whereas the 180° phase sinusoid signal is shown in its possible relationships with the pulse pairs on the right hand side of FIGURE 12. Moreover, the pulse pairs resulting from an error signal of one sign are shown in the upper portion of FIGURE 12 whereas the pulse pairs resulting from an error signal of the opposite sign are shown in the lower portion of FIGURE 12.

Referring to the upper left hand side of FIGURE 12, the zero phase sinusoid $S_1$ will be arbitrarily selected as indicating a positive (+) core input and the pulse pair $P_1$, $P_2$ separated by one cycle of the sinusoid and with the positive pulse synchronized to occur at the ¼ cycle point, will be arbitrarily selected as indicating a positive (+) error signal. Under these conditions, if the dashed lines $D_1$ and $D_2$ represent the positive and negative threshold values of the multiaperture magnetic cores 102, it will be apparent that the superimposed zero phase sinusoid and pulse pair $P_1$, $P_2$ will produce a signal $A_1$ effective to adapt or move the domain wall of the multiaperture core in one direction. If, on the other hand, the opposite sign of error signal is present, with a positive core input, the pulse pair $P_3$, $P_4$ will be produced which, as seen in the lower left of FIGURE 12, is characterized by the positive pulse $P_3$ occurring ½ cycle later than did the pulse $P_1$. In this case, the superimposed zero phase sinusoid and pulse pair $P_3$, $P_4$ will produce a signal $A_2$ effective to move the domain wall in the direction opposite to the movement caused by signal $A_1$. Similarly, combinations of the 180° phase sinusoid $S_2$ and the pulse pairs $P_1$, $P_2$ and $P_3$, $P_4$ produce the signals $A_3$ and $A_4$ shown on the right hand side of FIGURE 12.

The positive pulses $P_1$ and $P_3$ appear at the conductor 118 and the negative pulses $P_2$ and $P_4$ appear at the conductor 119 (FIGURE 11) and the two pulses of each pair, $P_1$, $P_2$ or $P_3$, $P_4$ are summed at 120 and applied to the cores 104 and 106 through conductor 121 by means of a suitable current driver 122.

With reefrence to FIGURE 13, the initial states of flux for the logic cores 104 and 106 are clockwise and counterclockwise respectively, there being a conductor 123 which initially sets these cores to such states, as will hereinafter be seen. The pulse pair, either $P_1$ and $P_2$ or $P_3$ and $P_4$, is coupled to the logic cores by the previously mentioned conductor 121, whereas the sinusoid $S_1$ and $S_2$ is coupled to the logic cores by means of the conductor 124. As discussed in conjunction with FIGURE 12, one of the signals $A_1$, $A_2$, $A_3$ or $A_4$ will result so that only one of the logic cores 104 and 106 will be switched. Both logic cores will then be in the same state and dependent upon which logic core is switched, an adapt signal of appropriate polarity will be coupled to the multiaperture core 102 by means of the adapt signal conductor 126. When the logic cores 104 and 106 are reset, the signal present at the conductor 123 is such that, although its voltage-time produce is sufficient to return the switched logic core to its initial state, it is of such shape as to produce a signal of insufficient amplitude at the adapt winding 126, due to switching, such as would alter the flux level of the core 102.

The readout signal appears at the winding 128 which is applied to the summing amplifier 130 (FIGURE 10) whereafter the summed signals from the various cores are applied to the averaging and gating circuit 132 whose output combined with a dynamic bias signal or conductor 76 goes to the summing amplifier 134. The winding 136 is used to set each core 102 to an initial state of flux in which its flux level is in either direction. To prevent each core 102 from being driven to a flux level which is more than a predetermined level below that of its initial state, a constant bias is applied to hold winding 138.

Referring to FIGURE 11, the output from the master oscillator 108 is applied to the divider 140 whose pulse output at conductor 141 is at a low adjustable rate relative to the rate of correction of the gain elements. As shown, the output of the divider 140 is applied to set the flip-flop 150 to its normally high state and to a monostable multivibrator 142 having a negative pulse output of 15 $\mu$s. (15 microseconds) duration which is applied to monostable multivibrator 144 whose pulse output at 146 is of 5 $\mu$s. duration; this output being used to allow the sample and hold circuit 148 to measure the analog error signal $\epsilon$. The conductor 141 may also be applied to the shift generator 185 as shown is dashed lines to provide a uniform shift rate if such is desired. The ¼ and ¾ cycle delay monostable multivibrators 152 and 154 are triggered by the output of the divider 156 and their outputs are applied respectively to the AND gates 158 and 160. The two AND gates are each provided with two additional inputs, one from the normally high output of the flip-flop 150 and the other from the output and the inverted output, respectively, of the Schmidt trigger circuit 162. The trigger circuit 162 is coupled to the error signal $\epsilon$ so that the trigger output at 164 will be the sign of the error signal while the inverted output at 166 will be the sign which is minus that of the error signal $\epsilon$. As a consequence, one or the other of the AND gates will be inhibited by the Schmidt trigger output or the inverted output, dependent upon the sign of the error signal $\epsilon$, and both AND gates will be inhibited by the low state of the flip-flop 150.

The ¼ cycle or ¾ cycle delayed signal, dependent upon which AND gates operates, is accepted by the OR gate 168 and applied to the 2 $\mu$s. monostable multivibrator 170 whose output at 118 supplies either the $P_1$ or $P_3$ pulse. The output of the multivibrator 170 also triggers the sinusoidal cycle (100 $\mu$s.) delay monostable multivibrator 174 which in turn triggers the 2 $\mu$s. monostable multivibrator 176 whose output at 119 supplies either the $P_2$ or $P_4$ pulse.

The output of the OR gate 168 is also applied to a 6-bit counter 180 the output of which is converted to an analog signal by the digital-to-analog converter 182 and this analog output is applied to the comparator 184. The output from the sample and hold circuit 148 is also applied to the comparator 184. When the compared signals are identical, the output of the comparator 184 will set the flip-flop 150 to its low state, thus inhibiting both AND gates 158 and 160 so that adaptation of the trainable gains ceases. The system then remains inactive until the counter 140 produces an output to the shift generator 185 requiring a new input pattern in the input mechanism.

Resetting the bucket cores 104 and 106 without inducing a voltage on conductor 126 large enough to reverse adapt the core 102 requires a special waveform to be supplied to conductor 123 of FIGURE 13. This waveform is generated during a reset interval which is of sufficient time duration to allow the waveform to reset the cores 104 and 106 without exceeding the threshold voltage of the core 102 and is described with reference to FIGURE 11 wherein the reset interval is of 800 $\mu$s. duration. The output of the divider 156, which determines the basic cycle time, is fed to the 500 $\mu$s. monostable multivibrator or one shot 200, the 50 $\mu$s. one shot 202 and the delay multivibrator 204 simultaneously. The delay multivibrator 204 in turn triggers a 200 $\mu$s. one shot 206. The timing is so arranged that during the first 50 $\mu$s. of the reset interval, circuits 200 and 202 are energized; during the 50–500 $\mu$s. interval, circuit 200 is energized; and during the 500–700 $\mu$s. interval, circuit 206 is energized. After this time, the reset waveform circuitry is returned at a predetermined rate to a zero state. The pulse waveforms from circuits 200, 202, 206 are summed and integrated at 208 to yield a ramp-like waveform on conductor 123 with varying slopes in the prescribed intervals. With proper adjustments on the integration rates for the different portions of the waveforms the induced voltage at conductor 126 is never greater than the threshold of the core 102.

If adaptation has been completed before the shift generator requires a new input pattern, a certain amount of dead time is experienced. To avoid this dead time, the fixed rate sampling or synchronous shifting mode of operation described may be dispensed with and an asynchronous type of shifting may be used instead.

For asynchronous shifting, the input to the shift generator 185 would be derived from the comparator 184. At the time of comparison of the output signals of the sample and hold circuit 148 and the converter 182, the signal for resetting the flip-flop 150 is also used to shift a new input pattern, via shift generator 185, into position. The dead time is thus eliminated.

The self-organizing device of FIGURE 10 may be used to accept any of the following types of inputs:

(1) A sequential 6 bit digital parallel input.

(2) A sequential 48 bit digital parallel input.
(3) 8 parallel input 6 bit digital signals.

The first type of signal input requires the input circuitry shown in FIGURE 10. The inputs are supplied to the 6 bit parallel 8 stage shift register, the digital equivalent to a tapped relay line. The other two possible input formats are accepted directly in the flip-flops 107 in parallel in which cases the conductors 82, 84, 86, 88, etc., are eliminated. In any case, the input pattern to the trainable net is the 48 bit parallel digital output of the respective flip-flops 107.

As has been discussed previously, there are various ways in which the principles of the present invention may be utilized in the practical sense. As shown in FIGURE 5, the self-organizing device may be used in parallel with some unknown plant to model the transfer function of the unknown plant with least mean squared error. Alternatively, as shown in FIGURE 8, a series combination of an unknown plant and a self-organizing device may be used in parallel with some ideal or desired transfer function so that the combination of the unknown plant and the self-organizing device will produce a transfer function which approximates that of the ideal with least mean squared error. For the special case where the ideal transfer function is unity, we have the situation shown in FIGURE 6 and in this case, the self-organizing device will approximate the inverse of the transfer function of the unknown plant, with which it is in series, with least mean squared error (i.e., the product of the transfer functions of the unknown plant and the self-organizing device will approximate unity). Thus, in a sense, the self-organizing device of the present invention can always be viewed as performing a function modeling operation. In FIGURE 5, the self-organizing device directly models the transfer function of the unknown plant. In FIGURE 6, the combination of the unknown plant and the self-organizing device models unity output whereas in the case of FIGURE 8, the combination of the unknown plant and the self-organizing device models some ideal transfer function.

Within the framework of the above, the limitation is imposed that the self-organizing device must follow the unknown plant and in cases where this is an impossibility, the principles of FIGURE 5 are used to model the transfer function of the plant and by ganging this model to a further self-organizing device and then placing a further self-organizing device in following relation thereto which in turn is ganged to the self-organizing device preceding the unknown plant, we have an arrangement similar to that depicted in FIGURE 9 wherein this relationship, in combination with an unknown plant, models some ideal transfer function. This ganging or slaving concept can, however, be applied in any of the modeling modes discussed above wherever the requirement for a self-organizing device preceding an unknown plant is encountered. Thus, within the framework of the present invention there is provided a self-organizing device which either alone or in conjunction with an unknown plant preceding the self-organizing device models and follows a particular transfer function. In the case of FIGURE 5, the modeled transfer function is that of an unknown plant whereas in FIGURE 6 the modeled transfer function is unity and in FIGURE 8 some ideal transfer function different from unity is that which is modeled.

Whereas only a few forms of the invention have been illustrated and described in detail hereinabove, it will be understood that various changes may be made therein without departing from the spirit of the invention or the scope of the following claims.

We claim:

1. A self-organizing device comprising, in combination: network means for providing a pattern of different input signals $v_0; v_1; v_2 \ldots v_n$;
a plurality $n+1$ of variable gain means having gains $g_0; g_1; g_2 \ldots g_n$ and having the individual signals of said pattern as inputs thereto,
means for summing the outputs of said variable gain means to provide an output $$\delta(t) = \sum_{i=0}^{n} g_i v_i$$

means for comparing the output $\delta(t)$ and a signal corresponding to a function of the pattern to provide an error signal $\epsilon(t)$, and means for adjusting the individual gains $g_j$ of the variable gain means according to the algorithm:

$$\dot{g}_j = -k_0 \epsilon(t) \frac{\partial \delta(t)}{\partial g_j}$$

where:
$\dot{g}_j$ is the rate of change in any gain $g_j$,
$k_0$ is a positive constant,
$\partial \epsilon(t)/\partial g_j$ is the partial derivative of the error signal $\epsilon(t)$ with respect to the corresponding gains $g_j$.

2. A self-organizing device comprising, in combination: network means for providing a pattern of signals $\epsilon_1(t-\tau_0); \epsilon_1(t-\tau_1); \epsilon_1(t-\tau_2); \ldots \epsilon_1(t-\tau_n)$ in response to an input signal $\epsilon_1(t)$,
a first plurality $n+1$ of variable gain means having gains $g_0; g_1; g_2 \ldots g_n$ and having the individual signals of said pattern as inputs thereto,
a second plurality $n$ of variable gain means having gains $g'_1; g'_2 \ldots g'_n$ and having the individual signals of said pattern as inputs thereto,
means for summing to outputs of said first variable gain means to provide an output $$\delta(t) = \sum_{i=0}^{n} g_i \epsilon_1(t-\tau_i)$$

means for obtaining the difference between said output $\delta(t)$ and a comparison signal corresponding to the pattern to provide an error signal $\epsilon_0(t)$,
means for adjusting the individual gains of said first gain means according to the algorithm:

$$\Delta g_j = -k_0 \epsilon_0(t) \frac{\partial \epsilon_0(t)}{\partial g_j}$$

where:
$\Delta g_j$ is the change in any of said first gains $g_j$
$k_0$ is a constant
$\partial \epsilon_0(t)/\partial g_j$ is the partial derivative of the error signal $\epsilon_0(t)$ with respect to the corresponding gain $g_j$,
means for summing the outputs of said second variable gain means to provide an output:

$$\rho(t) = \sum_{i=0}^{n} g'_i \epsilon_1(t-\tau_i)$$

means for obtaining the difference between said output $\rho(t)$ and an input signal $F(t)$ to yield said input signals $\epsilon_1(t)$,
and means for adjusting the individual gains of said second gain means according to the algorithm:

$$\Delta g'_j = k_0 \epsilon_0(t) \frac{\partial \epsilon_0(t)}{\partial g'_j}$$

where:
$\Delta g'_j$ is the change in any of said second gains $g'_j$
$k_0$ is a constant
$\partial \epsilon_0(t)/\partial g'_j$ is the partial derivative of the error signal $\epsilon_0(t)$ with respect to a corresponding gain $g'_j$.

3. The device according to claim 2 wherein the last means includes means for providing a pattern $\delta(t-v_0); \delta(t-v_1); \delta(t-v_2); \ldots \delta(t-v_n)$ in response to an input of said summed output $\delta(t)$.

4. In a self-organizing device, in combination: network means for providing a pattern of signals $F(t-\tau_0), F(t-\tau_1), F(t-\tau_2) \ldots F(t-\tau_n)$ in response to an input signal $F(t)$, a plurality $n+1$ of variable gain means having gains $g_0; g_1; g_2 \ldots g_n$ and having the individual signals of said pattern as inputs thereto, a plant having an impulsive response $W(\sigma)$ and having said input $F(t)$ to provide an output $\tau(t)$, means for summing the outputs of said variable gain means to provide an output $$\delta(t) = \sum_{i=0}^{n} g_i F(t - \tau_i)$$

means for obtaining the difference between said outputs $\delta(t)$ and $\tau(t)$ to provide an error signal $\epsilon(t)$, means for adjusting the individual gains $g_j$ of the variable gain means according to the algorithm:

$$\Delta g_j = -k_0 \epsilon(t) \frac{\partial \epsilon(t)}{\partial g_j}$$

where:

$\Delta g_j$ is the rate of change in any gain $g_j$ $k_0$ is a positive constant $\partial \epsilon(t)/\partial g_j$ is the partial derivative of the error signal $\epsilon(t)$ with respect to the corresponding gains $g_j$, second network means for providing a pattern of signals $f(t-\tau_0); f(t-\tau_1); f(t-\tau_2) \ldots f(t-\tau_n)$ in response to said input signal $F(t)$, a plurality $n+1$ of variable gain means having gains $g'_0; g'_1; g'_2 \ldots g'_n$ and having the individual signals of said second network pattern as inputs thereto, and means for adjusting the individual gains $g'_j$ so that $|g_i = g'_i|$ for all $i = 0, 1, 2 \ldots n$.

5. In a self-organizing device comprising, in combination:

a trainable net including a plurality of trainable gain elements arranged in parallel, means for summing the outputs of said trainable gains, means for producing an error signal indicative of the difference between said summed outputs of the trainable gains and a desired summed output for said gains, each of said trainable gain elements comprising a magnetic core of square hysteresis loop characteristics and having a major and a minor aperture, an input winding coupled to said core through said minor aperture, a readout winding coupled to said magnetic core through said minor aperture, and an adapt winding coupled to said magnetic core through said major aperture, means for applying a binary input signal to each of said input windings, in which binary input signal is a sinusoid of fixed frequency in which two different phases of the sinusoid represent the 0 and 1 states, and in which the peak amplitude of the sinusoid is less than the threshold for each magnetic core, adapt means coupled to said binary input signal for increasing the amplitude of a positive peak of said sinusoid to a value greater than the threshold of said magnetic core when said error signal output is of one sign and for increasing the negative amplitude of a negative peak of said sinusoid to a value greater than the threshold of said magnetic core when the error signal output is of opposite sign, said adapt means being coupled to said adapt winding of a respective magnetic core.

6. In a self-organizing device, in combination:

a plurality of multiaperture magnetic cores each having a major aperture and a minor aperture, a readin winding coupled through said minor aperture, a readout winding coupled through said minor aperture, and an adapt winding coupled through said major aperture, means for applying a pattern of binary signals to said readin windings in which each binary signal is a sinusoid having peak amplitudes less than the threshold of said core and the 0 and 1 states are represented by relatively shifted phase components of the signal, means for summing the outputs of said readout windings, error signal means for determining the magnitude and sign of the error of said summed output of the readout windings, logic means coupled to the binary readin signal of each core and to said error signal for energizing said adapt winding of the respective core to partially switch the magnetic flux of such core according to the following:

$$\dot{g}_j = -k_0 \epsilon(t) \frac{\partial \epsilon(t)}{\partial g_j}$$

where:

$\dot{g}_j$ is the rate of change in gain of a respective core due to flux switching $k_0$ is a positive constant $\epsilon(t)$ is the error signal $\partial \epsilon(t)/\partial g_j$ is the partial derivative of the error signal with respect to the corresponding gain $g_j$.

7. The self-organizing device according to claim 1 including a plurality $n$ of second variable gain means having gains $g'_1; g'_2 \ldots g'_n$ and having the individual signals of said pattern as inputs thereto, means for summing the outputs of said second variable gain means to provide an output $$\rho(t) = \sum_{k=1}^{n} g'_k \nu_k$$

means for obtaining the difference between an input signal $f(t)$ and the output signal $\rho(t)$ to provide the error signal $\epsilon(t)$, and means for adjusting the individual gains $g'_k$ according to the algorithm:

$$\dot{g}'_j = -k_0 \epsilon(t) \frac{\partial \epsilon(t)}{\partial g'_j}$$

where:

$\dot{g}'_j$ is the rate of change of any gain $g'_j$ $k_0$ is a positive constant $\partial \epsilon(t)/\partial g'_j$ is the partial derivative of the error signal $\epsilon(t)$ with respect to the corresponding gain $g'_j$.

8. The self-organizing device according to claim 7 wherein the last means comprises a second network means for providing a pattern of different input signals $n_1, n_2 \ldots n_n$ and having an input $Y(t)$, a plurality $n$ of third variable gain means having gains $g''_1; g''_2 \ldots g''_n$ and having the outputs $n$ as individual inputs thereto, means for summing the outputs of said third variable gain means to provide an output $$V(t) = \sum_{k=1}^{n} g''_k n_k$$

means for subtracting the output $\delta(t)$ from the output $V(t)$ to produce the input $Y(t)$, means for adjusting the individual gains $g''_k$ according to the algorithm:

$$\dot{g}''_j = -k_0 \epsilon(t) \frac{\partial \epsilon(t)}{\partial g''_j}$$

and means slaving the gains $g'_k$ to the gains $g''_k$.

9. A self-organizing system comprising, in combination:

a plant having an intrinsic response P, a self-organizing device having an adjustable intrinsic response L, said plant and self organizing device being arranged in parallel and having a common input, means for obtaining the difference between the output of said plant and the output of said self-organizing device, in response to said common input, to provide an error signal $\epsilon$, said self-organizing device including network means for providing a pattern of different input signals $v_0$; $v_1$; $v_2 \ldots v_m$; a plurality $n+1$ of variable gain means having gains $g_0$; $g_1$; $g_2 \ldots g_n$ and having the individual signals of said pattern as inputs thereto, means for summing the outputs of said variable gain means to provide an output $$\delta(t) = \sum_{i=0}^{n} g_i v_i$$

and means for adjusting the individual gains $g_j$ of the variable gain means according to the algorithm:

$$\dot{g}_j = -k_0 \epsilon(t) \frac{\partial \epsilon(t)}{\partial g_j}$$

where:

$\dot{g}_j$ is the rate of change in any gain $g_j$
$k_0$ is a positive constant
$\partial \epsilon(t)/\partial g_j$ is the partial derivative of the error signal $\epsilon(t)$ with respect to the corresponding gain $g_j$, whereby $L \approx P$.

10. A self-organizing system comprising, in combination:
an entity having an intrinsic response I,
a plant having an intrinsic response P,
a self-organizing device having an adjustable intrinsic response L,
said plant and self-organizing device being arranged in series with the self-organizing device following the plant, and said entity being arranged in parallel with the plant-device combination to share a common input,
means for obtaining the difference between the output of said entity and the output of said plant-device combination, in response to the common input, to provide an error signal $\epsilon$,
said self-organizing device including network means for providing a pattern of different input signals $v_0$; $v_1$; $v_2 \ldots v_n$; a plurality $n+1$ of variable gain means having gains $g_0$; $g_1$; $g_2 \ldots g_n$ and having the individual signals of said pattern as inputs thereto, means for summing the outputs of said variable gain means to provide an output $$\delta(t) = \sum_{i=0}^{n} g_i v_i$$

and means for adjusting the individual gains $g_j$ of the variable gain means according to the algorithm:

$$\dot{g}_j = -k_0 \epsilon(t) \frac{\partial \epsilon(t)}{\partial g_j}$$

where:

$\dot{g}_j$ is the rate of change in any gain $g_j$
$k_0$ is a positive constant
$\partial \epsilon(t)/\partial g_j$ is the partial derivative of the error signal $\epsilon(t)$ with respect to the corresponding gains $g_j$, whereby $P \times L \approx 1$.

11. A self-organizing system comprising, in combination:
a plant having an intrinsic response P,
a self-organizing device having an adjustable intrinsic response L, said plant and device being arranged in series with the device following the plant,
means for providing an input to said plant,
means for obtaining the difference between the output of said device and said input to provide an error signal $\epsilon$,
said self-organizing device including network means for providing a pattern of different signals $v_0$; $v_1$; $v_2 \ldots v_n$; a plurality $n+1$ of variable gain means having gains $g_0$; $g_1$; $g_2 \ldots g_n$ and having the individual signals of said pattern as inputs thereto, means for summing the outputs of said variable gain means to provide an output $$\delta(t) = \sum_{i=0}^{n} g_i v_i$$

and means for adjusting the individual gains $g_j$ of the variable gain means according to the algorithm:

$$\dot{g}_j = -k_0 \epsilon(t) \frac{\partial \epsilon(t)}{\partial g_j}$$

where:

$\dot{g}_j$ is the rate of change in any gain
$k_0$ is a positive constant
$\partial \epsilon(t)/\partial g_j$ is the partial derivative of the error signal $\epsilon(t)$ with respect to the corresponding gains $g_j$, whereby $P \times L \approx$ unity.

12. A self-organizing system, comprising, in combination:
a self-organizing device having an initially arbitrary transfer function and including means responsive to an input thereto for altering such initial transfer function to converge to some different value dependent upon the nature of the said input,
second means in parallel with said self organizing device having a predetermined transfer function,
and means for comparing the outputs of said second means and said self organizing device for providing said input.

13. The system according to claim 12 wherein said second means is an ideal entity having a known transfer function, there being a plant having an unknown transfer functio preceding said self-organizing device whereby the combination of the self organizing device and unknown plant models the ideal.

14. A self-organizing device having an initially arbitrary transfer function and including means responsive to an input thereto for altering such initial transfer function to converge to some different value dependent upon the nature of said input, said device including, in combination:
a plurality of individually adjustable gain elements,
means for summing the outputs of said gain elements,
a delay line receiving said input and having a tapped output for producing a pattern of individual inputs to said gain elements,
means for producing an error signal from the output of said summing means,
and means for adjusting the individual gain of each gain element in accord with the partial derivative of the square of the error signal taken wtih respect to the gain of each such individual gain element.

15. A self-organizing device having an initially arbitrary transfer function and including means responsive to an input thereto for altering such initial transfer function to converge to some different value dependent upon the nature of said input, said device comprising, in combination:
a plurality $n+1$ of individually adjustable gain elements, one of which is connected to said input,
a plurality $n$ of networks receiving said input for producing a pattern of individual inputs to the remainder of said gain elements,
means for summing the outputs of said gain elements,
means for producing an error signal from the output of said summing means,
and means for adjusting the individual gain of each gain element in accord with the partial derivative of the square of the error signal taken with respect to the gain of each such individual gain element.

16. The self-organizing device according to claim 15 wherein said means for producing an error signal comprises a subtractor having the output of said means for summing as one input thereto, and an unknown plant connected to said input and having an output connected as the other input to said subtractor to provide a self organizing system in which the self organizing device models the transfer function of the unknown plant.

17. The self-organizing device according to claim 15 wherein said means for producing an error signal comprises a subtractor having the output of said means for summing as one input thereto, and an unknown plant having an output which is said input to the self organizing device and with the input to said unknown plant being connected as the other input to said subtractor to provide a self organizing system in which the self organizing device models the inverse of the transfer function of said unknown plant.

References Cited

UNITED STATES PATENTS

| 3,230,351 | 1/1966 | Platt et al. | 235—151 |
| 3,283,229 | 11/1966 | Lindahl | 318—18 |
| 3,287,615 | 11/1966 | Smyth | 318—28 |
| 3,333,248 | 7/1967 | Greenberg et al. | 340—172.5 |
| 3,341,821 | 9/1967 | Kessler | 340—172.5 |
| 3,341,823 | 9/1967 | Connelly | 340—172.5 |

ROBERT C. BAILEY, *Primary Examiner.*

R. B. ZACHE, *Assistant Examiner.*

U.S. Cl. X.R.

235—150.1; 318—18

UNITED STATES PATENT OFFICE
CERTIFICATE OF CORRECTION

Patent No. 3,435,422                                    March 25, 1969

Lester A. Gerhardt et al.

It is certified that error appears in the above identified patent and that said Letters Patent are hereby corrected as shown below:

Column 16, lines 52 and 53, in the equation, "i=o" should read -- i=1 --; line 74, "$F(t-\gamma_2$" should read -- $F(t-\gamma_2)$, --. Column 17, line 36, after "signal" insert -- output --. Column 19, line 72, after "different" insert -- input --.

Signed and sealed this 7th day of April 1970.

(SEAL)
Attest:

Edward M. Fletcher, Jr.
Attesting Officer

WILLIAM E. SCHUYLER, JR.
Commissioner of Patents